(12) United States Patent
Piratla et al.

(10) Patent No.: US 9,384,180 B2
(45) Date of Patent: Jul. 5, 2016

(54) METHODS AND SYSTEMS FOR PROCESSING FILLED FORMS

(71) Applicant: Xerox Corporation, Norwalk, CT (US)

(72) Inventors: Nischal M Piratla, Hyderabad (IN); Rinku Gajera, Kamataka (IN); Kovendhan Ponnavaikko, Tamil Nadu (IN); Mark Pettit, Warwickshire (GB)

(73) Assignee: Xerox Corporation, Norwalk, CT (US)

( * ) Notice: Subject to any disclaimer, the term of this patent is extended or adjusted under 35 U.S.C. 154(b) by 479 days.

(21) Appl. No.: 13/859,961

(22) Filed: Apr. 10, 2013

(65) Prior Publication Data

US 2014/0310583 A1    Oct. 16, 2014

(51) Int. Cl.
   *G06F 17/00*     (2006.01)
   *G06F 17/24*     (2006.01)

(52) U.S. Cl.
   CPC ............ *G06F 17/243* (2013.01); *G06F 17/248* (2013.01)

(58) Field of Classification Search
   CPC ................................................... G06F 17/243
   See application file for complete search history.

(56) References Cited

U.S. PATENT DOCUMENTS

| | | | | |
|---|---|---|---|---|
| 5,721,940 | A * | 2/1998 | Luther et al. | 715/200 |
| 7,607,078 | B2 * | 10/2009 | Geva et al. | 715/221 |
| 2003/0048949 | A1 * | 3/2003 | Bern | G06K 9/342 382/218 |
| 2003/0144912 | A1 * | 7/2003 | McGee | G06Q 30/06 705/26.4 |
| 2007/0089049 | A1 * | 4/2007 | Gormish et al. | 715/507 |
| 2007/0154098 | A1 * | 7/2007 | Geva et al. | 382/209 |

OTHER PUBLICATIONS

Graph-Based Methods in Computer Vision, by Xiao Bai, Jian Cheng, Edwin Hancock, Publisher IGI Global, Publication Date Jul. 31, 2012, Chapter 1, Computer Vision Applications Using Graph Matching, pp. 1-8.*

* cited by examiner

*Primary Examiner* — Kyle Stork
*Assistant Examiner* — Barbara Level
(74) *Attorney, Agent, or Firm* — Philip E. Blair; Fleit Gibbons Gutman Bongini & Bianco P.L.

(57) ABSTRACT

The present disclosure describes a method and system for processing forms filled by a user. The system includes a scanner configured to scan a first form in a first language that includes one or more fillable fields filled with content; a content extractor configured to extract content from the scanned filled fields; a content processor configured to process the extracted content; and an embedding module configured to embed the processed content into a second form including one or more fields corresponding to the fillable fields of the first form.

25 Claims, 5 Drawing Sheets

METHODS AND SYSTEMS FOR PROCESSING FILLED FORMS

TECHNICAL FIELD

The presently disclosed embodiments relate to document processing systems, and more particularly to processing of forms.

BACKGROUND

Many countries have multiple languages, for example, in India English is used for official corporate businesses at the national level, but English is not a common language used for communication. English is therefore taught in most schools as a second or third language. The level of proficiency of the second or third language may vary from beginner to intermediate among different people.

In day-to-day life people regularly encounter situations in which they may have to fill out forms such as, applications for bank accounts, Dish TV service, purchasing property, etc. The official language used in these forms is typically English, which the majority of literates are able to understand, at lease to the extent required to complete a form, such as full name, address, family details, etc. Not everyone may be comfortable with or clearly understand instructions or questions in the official language, however, and some persons may find it difficult to fill out such forms.

One approach to solving this problem has been to provide forms in the local language. In some cases, these forms are processed at central processing units or at either head office or back office branches, which may only accept English language forms. Indeed, the back office or the service provider's central office may be located in a different state with a different local language, where the staff may not understand the user's local language.

To solve this problem service providers often maintain templates of typical forms in the various local languages likely to be used (e.g., Spanish), which provide reference documents containing exact matches from field to field with the official language form (e.g., English). The users are thus assisted in filling out the English form by making use of the local language template as an aid. For example, a bank may use a local language template, such as Spanish, French, or Tamil, to assist in filling out the corresponding official language form. It will be appreciated that this approach is prone to error, as users tend to mix up fields.

Thus, there exists a need for techniques that provides a convenient and manageable way to process forms filled out in different languages.

SUMMARY

The present disclosure provides a document processing system for processing different types of forms filled out by a user. The system includes a scanner configured to scan a first form in a first language that includes one or more fillable fields filled with content; a content extractor configured to extract content from the scanned filled fields; a content processor configured to process the extracted content; and an embedding module configured to embed the processed content into a second form including one or more fields corresponding to the fillable fields of the first form.

Further, according to the present disclosure there is provided a method for processing documents, the method including scanning a filled first form in a first language that includes one or more fields, extracting content from the filled fields to provide extracted content, and embedding the extracted content into a second form that includes one or more fields corresponding to the fillable fields of the first form. The method may further include processing the extracted content to rebuild lost content. The method may also include scaling the content to correspond to the size of the corresponding field in the second form. The method may also include comparing the pixel height of the content for each field and scaling the content for the various fields to a common pixel height.

Still further, according to the present disclosure, there is provided a method for processing documents, the method including scanning a first form in a first language that includes one or more fillable fields that have been filled with content, extracting the content from the filled fields to generate a secondary image, and overlaying the secondary image on a primary image to define a secondary image. The method further includes overlaying or merging the secondary image with a primary image to define a combined image. The primary image typically comprises a second form with fillable fields corresponding substantially to the fields of the first form. The method may further include processing the secondary image to rebuild lost content. The portions of the secondary image corresponding to content for specific fields in the second form may also be scaled to fit the corresponding fields in the second form. The processing step further includes comparing the pixel heights of portions of the secondary image corresponding to content for specific fields in the second form and scaling the portions of the image for the various fields to a common pixel height. The second form may be in a language different to that of the first form.

DETAILED DESCRIPTION

Figure 1:
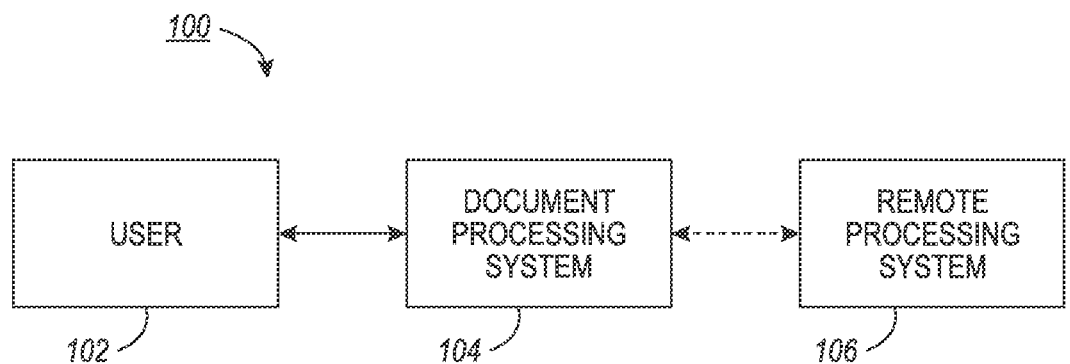
FIG. 1 illustrates an exemplary system where various embodiments of the present disclosure may function.

The following detailed description is made with reference to the figures. Preferred embodiments are described to illustrate the disclosure, not to limit its scope, which is defined by the claims. Those of ordinary skill in the art will recognize a number of equivalent variations in the description that follows.

As used herein, a Multi-Function Device (MFD) the term "MFD" as used herein includes a single device that offers a number of traditionally separate functionalities, such as printing, copying, scanning, and faxing. Further, "mobile device" refers to any device that has a wireless connection with a network or components related to the network. The "mobile device" can also be a landline telephone as long as it can communicate with the MFD remotely. The present disclosure includes mobile users such as cell phones, Smartphones, PDAs, and so on. Moreover, an "address" is any identifying information that allows a device to be accessed on a network, such as an IP address or URL, the URL including both long form (including full protocol information, such as "http://") or short form, beginning with "www" or only a website name, such as "foobar.com". An "access code" is an identifier capable of designating a specific device, such as an MFD, on a computer network or local computer system. A "telephone number" is an identifier capable of identifying a device or location on a telephone network of any type, including traditional voice networks, packet-oriented.

Overview

Embodiments of the present disclosure describe a document processing system for processing different types of forms. The systems and methods introduced in this disclosure aid users to effectively and efficiently process different types of forms filled by users. The document processing system may be a single device or a combination of one or more devices for processing different types of documents or forms that include fields to be filled in by users. The user can fill a form, which is provided in a regional or a local language understandable by the user. The user can thus select the desired form written in his or her language, fill in the fields with the requested personal details to define a first filled form, and then submit the first filled form for processing by the system. To this end, the document processing system includes a platen, for example, a scanning platform, where the user can place a filled first form that includes instructions in a local language and user-fillable fields. Usually, the platen is a flat surface of glass or metal to input document in the document processing system. The document processing system may include a module for extracting content from the fields of the filled form. Thereafter, the content may be corrected to rebuild lost content. Further, the content may be scaled and then embedded in a second form or template that includes one or more fillable fields corresponding to the fields in the first form. The second form may be in a different language, thereby creating a form in a second language, which is filled in with the user's data. The data may include the user's signature or the user may add the signature to the second form. Thus, the user may receive a printed second form filled with content, which the user can sign and submit, for example, by scanning the signed second document into the document processing system. The document processing system can send the processed forms to a remote processing system.

The remote processing system may include means for further processing the document in a manner known in the art. For example, banks have a central branch or head office which processes the application forms filled by the users and maintains a record of all the users. The document processing system includes templates of documents in the official language, the templates defining second forms. The system selects the appropriate template with corresponding fields to the first form and extracts and corrects the user-filled content from the first form. Thereafter, this content is embedded in the official language form. Moreover, specific management modules and software may be added to the document processing system.

The correction of the content may include processing, by a content processor, the extracted content to rebuild lost content, thereby creating rebuilt content corresponding to the content filled into the fields by of the first document. The content may be further be processed to ensure that the content fits within the space provided by the fields. In addition, the rebuilt content may be scaled to ensure uniform character height in all of the fields in the second document.

EXEMPLARY EMBODIMENTS

FIG. 1 illustrates an exemplary system 100 where various embodiments of the present disclosure may function. To analyse the present disclosure, the system 100 can be visualized as having three primary components, one or more users 102, a document processing system 104, and a remote processing system 106. The user 102 accesses or uses the document processing system 104 for filling and/or submitting various types of documents such as forms.

The user 102 may have to fill out forms, for example, applications for bank accounts, Dish TV service, purchasing property, etc. Service providers commonly require users to fill out forms for registering or providing services. These may include banking, dish TV service, cabs, tours, travels, and so forth to the users. The document processing system 104 processes the form or first document that is filled by the user 102. The user 102 places the filled form or first document on a platen or flat surface of the document processing system 104 in order to capture the information on the first document. The user 102 may interact with the document processing system 104 through a user interface. In one embodiment of the present disclosure, the user 102 may enter one or more personal information such as user id, password, unique identity (ID) for verifying his/her identity prior to using the document processing system 104.

The document processing system 104 may be associated with one or more service providers. For example, the document processing system 104 can be of an XYZ telecom service provider, which supports the various forms of the particular service provider. Instead, the processing system 104 may be implemented as a generic system with provider-specific forms accessed remotely, for example over the Internet from a central server. It will also be appreciated that instead of filling out forms by hand and then scanning the information into the document processing system 104, the user interface may allow the user to electronically enter the information into the various fields in the selected form.

The remote processing system 106 may be located at a head office or a central department of the service provider. That system 106 can also process documents, store templates, or maintain records of the submitted forms. The remote processing system 106 may have employees who can further process the documents received from the document processing system 104. These two systems may communicate through a network, local area network (LAN) or the like. The document processing system 104 and the remote processing system 106 may be at different locations. Further, the document processing system 104 and the remote processing system 106 may communicate using conventional network protocols. Communication in the reverse direction is carried out using similar protocols.

The form or document to be completed or filled out includes one or more fields that are to be filled out, and instructions in a first language, generally a local language such as Spanish, French, Hebrew, and so forth. The different users or regions in a country may have different local languages. In this manner, the user may fill out pre-printed physical forms in his or her preferred local language.

The user thus fills out the fields in the first form provided in the local language, and in this embodiment the user submits it to the document processing system 104, which can process the document and send it to the remote processing system 106 for further processing. The filled forms in this embodiment are processed at the document processing system 104 prior to forwarding them to the remote processing system 106. The document processing system 104 performs a comparison between the blank form and the filled form and extracts the data filled into the fields by the user. The data defines a secondary image that can be superimposed onto a primary image. By defining the primary image as a second document with fields corresponding in position and size to the fields of the first document, the extracted data can be superimposed onto the second document. In one application, the second document comprises a form with the same content as the first document but in the official language rather than the local language. The official language form or the second form will be an exact field-by-field copy of the local language form or the first form.

The document processing system 104 includes a module to correct and rebuild any lost content from the filled-in data. The document processing system 104 may further include a scaling module to scale the secondary image or the extracted content of the filled fields to accommodate the space on the second form. Thereafter, the document processing system 104 overlays or embeds the content onto the second form, which is in the official language such as English.

Figure 2:
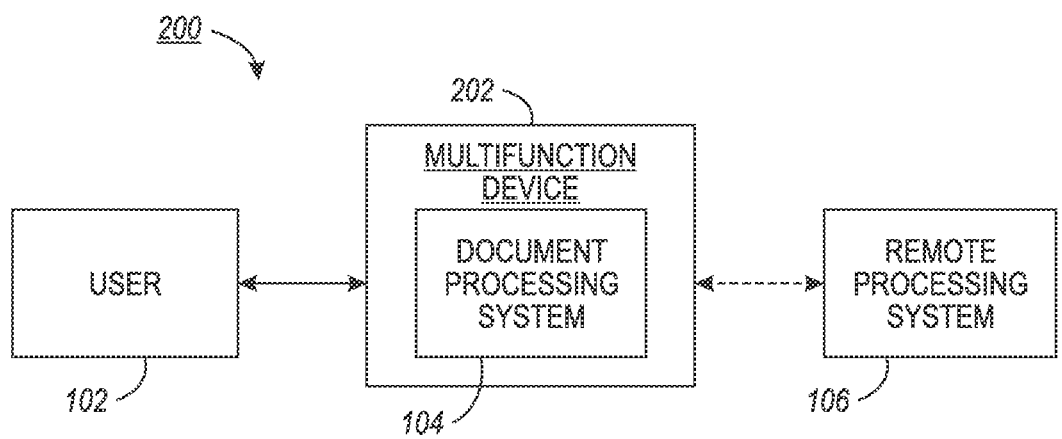
FIG. 2 illustrates another exemplary system where various embodiments of the present disclosure may function.

FIG. 2 illustrates another exemplary system 200 where various embodiments of the present disclosure may function. As discussed with reference to FIG. 1, the document processing system 104 can process the forms according to the type of form. As shown, the user 102 can access one or more services from a Multi-Function Device (MFD) 202. In the system 200, the document processing system 104 is an integrated system within the MFD 202. The MFD 202 is a device that performs printing, scanning, copying, or other known imaging functions. It will be understood that the MFD 202 may perform one, few, or all of the mentioned operations without departing from the scope of the present disclosure. For example, the MFD 202 may be a standalone printer or facsimile machine. Alternatively, the MFD 202 may be a three-in-one printer, scanner, and copier. Further, the MFD 202 may include a suitable interface allowing it to connect with the network and the mobile devices. These interfaces include network interface, cellular interface, or parallel to serial interface. In the illustrated embodiment, the MFD 202 includes a network interface facilitating network connectivity. The users can fill a form and submit at the MFD 202 using one or more interfaces of the MFD 202.

The document processing system 104 can scan and process the forms including the filled-out fields. The form can be provided in different languages such as a first/local language depending on the user's language preference. The local language can be such as, but not limited to, Spanish, French, Hebrew, Dutch, Chinese, Irish, and so forth.

If the first form with its filled out fields is sent directly to the remote processing system 106 for further processing and actions, the employees of the remote processing system 106 may not understand the language of the filled forms. For such situations, the present disclosure provides a solution by integrating the document processing system 104 in the MFD 202 itself. The document or the filled forms are processed at the MFD 202 or the document processing system 104 prior to forwarding them to the remote system 106. The document processing system 104 can extract the content from the first form and can embed it onto the fillable fields of a second form. The remote processing system 106 selects the second form in the official language, with blank fields, and receives content of the first form filled by the user 102.

Figure 3:
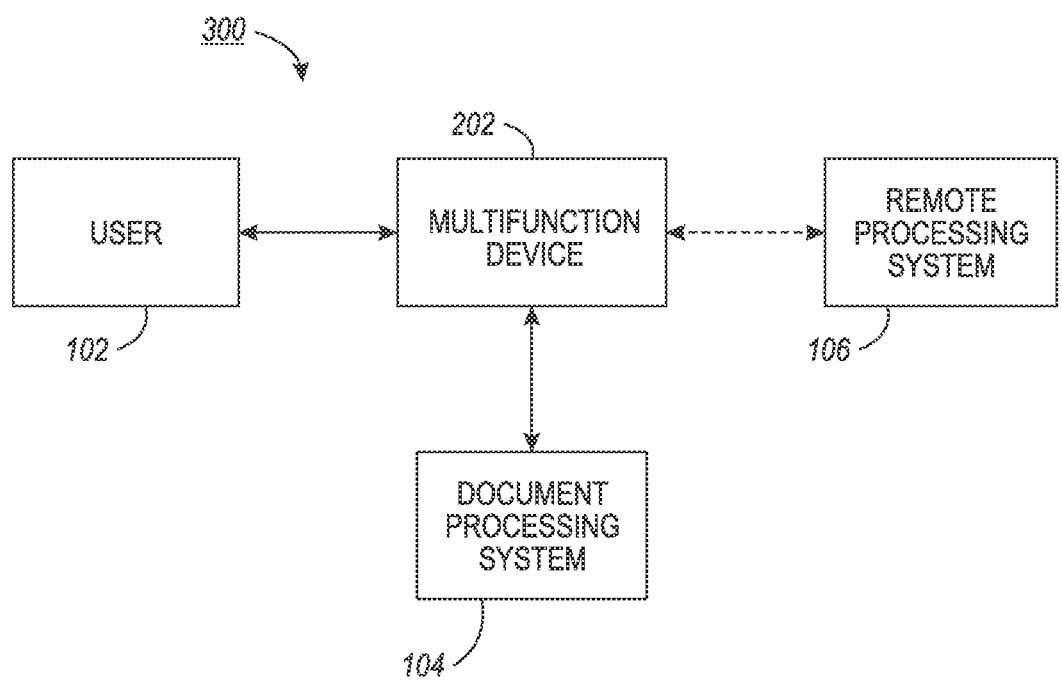
FIG. 3 illustrates yet another exemplary system where various embodiments of the present disclosure may function.

In one embodiment, the document processing system 104 is not integrated into the MFD 202. However, the MFD 202 can connect to the document processing system 104 through wired or wireless means as shown in FIG. 3. In system 300, the user 102 can fill a first form at the MFD 202; the first form is then forwarded to the attached document processing system 104. The document processing system 104 may scan the filled first form(s) in a first language, which can be a local language of the user 102, including one or more fields. Then, the document processing system 104 can extract the content from the scanned form or scanned image. The document processing system 104 includes a template of forms in a second language or an official language including fields. The document processing system 104 can also rebuild or correct the content in case of any lost content while extraction process. This may include a broken stroke reconstruction algorithm. The document processing system 104 may further include a module configured to embed the rebuilt content in corresponding fields of a second form, which may be in a different language to the first form. The module for embedding may include a merge module configured to merge multiple images into a single combined image. The module for embedding may also include a scaling module configured to compare image size to the space available and scaling the image to accommodate the space. Thus, the rebuilt content may have to be scaled in order to fit into the corresponding field of the second form. The scaling module may also compare the pixel height of the content for each field and scale the content for the various fields to a common pixel height.

In an embodiment, the second form including the content extracted from the first form can be printed or presented to the user 102. The user 102 may sign or confirm the content of the second form and can resubmit at the MFD 202. Thereafter, this second form may be sent to the remote processing system 106. The user 102 can sign the printed second form, or he/she may sign virtually on the processed form in case of a touch sensitive interface of the document processing system 104 or the MFD 202.

Figure 4:
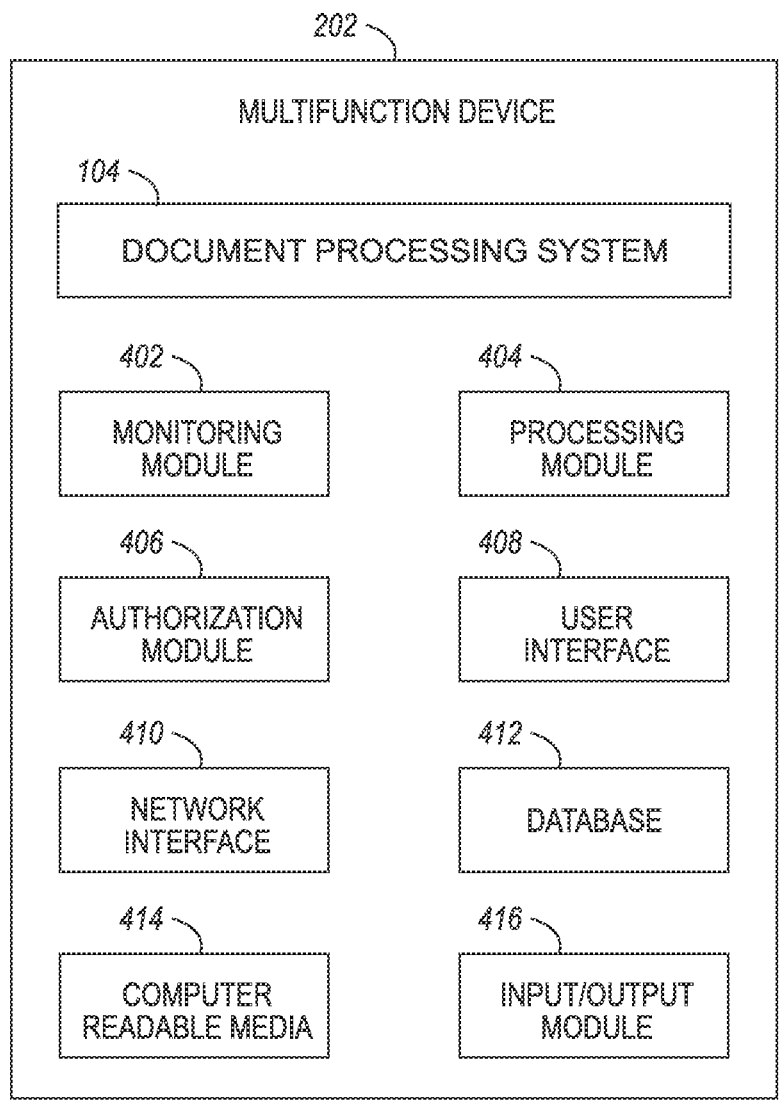
FIG. 4 illustrates structural components of a Multi-Function Device (MFD), according to an embodiment of the present disclosure.

FIG. 4 illustrates structural components of an exemplary Multi-Function Device (MFD), according to an embodiment of the present disclosure. As discussed with reference to FIG. 2 and FIG. 3, the user 102 can interact with the document processing system 104 directly or indirectly through the MFD 202, which in turn may connect to a remote processing system 106, for accessing one or more services. The MFD 202 incorporates into a single device a number of traditionally separate functionalities, such as printing, copying, scanning, and faxing. To make these functionalities available to multiple users, the MFD 202 is often incorporated in a computing network, allowing users to communicate directly with the MFD 202. As shown the document processing system 104 is configured within the MFD 202.

To be able to perform above mentioned functions, the MFD 202 includes a monitoring module 402, a processing module 404, an authorization module 406, a user interface 408, a network interface 410, a database 412, a computer readable media 414, and an Input/Output module 416. Each of these system components will be described in detail in the following sections. The network interface 410 allows the MFD 202 to receive and send information to the remote processing system 106. The input/output (IO) module 416 may take information or may output information to the user 102. The user 102 may submit the first form at the MFD 202 using the IO module 416. In addition, the IO module 416 may include a printer for printing the forms. In some instances, the monitoring module 402 may monitor multiple MFD parameters, such as usage, toner availability, performance, paper jam based on requests received from the user 102 or the remote processing system 106.

The processing module 404 may receive information from the monitoring module 402 and provide processed information to the user interface 408, the network interface 410 and to the database 412. To this end, the processing module 404 converts the received information into user readable format (in case the information is provided to a user) and database or module readable format (in case information is received from a user). The user 102 may also interact with the MFD 202 through the user interface 408. The user interface 408 can be a graphical user interface (GUI).

In case the processing module 404 receives data such as a filled form from the user 102 or the remote processing system 106, it may process that information and act upon it, as required. For example, if the received information is a print command, then, the processing module 404 retrieves the data to be printed and automatically give a print command to the MFD 202.

The authorization module 406 regulates access to the MFD 202 based on predetermined user IDs, access codes or pre-configured telephone numbers. For example, each cell phone number of the user 102, or the user 102 may have an associated access code, or unique identity (ID) known only to the user 102. So, along with the print command, users may also be prompted to enter an access code or ID for authenticating the user 102 prior to providing access to the MFD 202. For these functions, the database 412 stores profiles of users that includes user information, access codes, telephone numbers, unique IDs, names, preferred printing configurations, preferred paper quality, etc.

The user interface 408 includes multiple modes of communication, for example, it may be a simple display, an interactive touch screen display, an audio system, a combination of a display and audio system. In addition, the user interface 408 may include and provide one or more options to the user 102, for example, for selecting a type of service or form, for submitting form, printing, and so forth. The form is a first form in a first language or the local language of the user 102 including one or more fillable fields to be filled by the user. The local language can depend on the region, state, or the country, or the preference of the population in an area of the MFD 202. The first form may include one or more instructions for the user 102 helping him/her to fill out the form correctly. Further, the instructions may be in first language or the local language for better understanding of the user 102.

The document processing system 104 can scan the filled first form. In an embodiment, the MFD 202 may scan the filled first form. Thereafter, the document processing system 104 processes the scanned document to extract the filled content from the filled fields. The content may be extracted from the first form by using any of the existing conventional methods such as, but are not limited to, a match-lifting algorithm. The match-lifting algorithm computes pixel-by-pixel difference between the filled up form and the original unfilled form. For example, in a binary image, whichever pixels are filled in the original form, i.e., the first form are removed from the filled out image to allow further processing of only the filled out content. Then, the content is corrected by scaling or rebuilding the lost data, and so forth. When the difference is computed, some portions of the entries made can be lost, especially whose which were made over the original form's content. So, the difference is next subjected to a broken stroke algorithm, which rebuilds the lost content. The small gaps in figures or images can be quite accurately bridged using structural analysis and stroke extension. Several stroke reconstruction algorithms exist such as content dilation.

The database 412 may store one or more templates or un-filled first or second forms. The corrected content is then overlaid or embedded onto an un-filled second form, which may be in a second language, e.g., the official language, and having fillable fields corresponding to those of the first form using the document processing system 104. The document processing system 104 may itself include many modules for scanning, extracting etc. as described in detail in FIG. 5. The system may further include a module for embedding the rebuilt content in corresponding fields of a second form, which may be in a different language to the first form. The module for embedding may include a merge module that merges multiple images into a single combined image. The module for embedding may also include a scaling module for comparing image size to the space available and scaling the image to accommodate the space. Thus, the rebuilt content may have to be scaled in order to fit into the corresponding field of the second form. The scaling module may also compare the pixel height of the content for each field and scale the content for the various fields to a common pixel height. During scaling, the size of the image with the extracted entries is increased or decreased based on the size of the second form. The document processing system 104 includes a transceiver configured to send a number of forms such as the filled out second form to a remote processing system 106.

Figure 5:
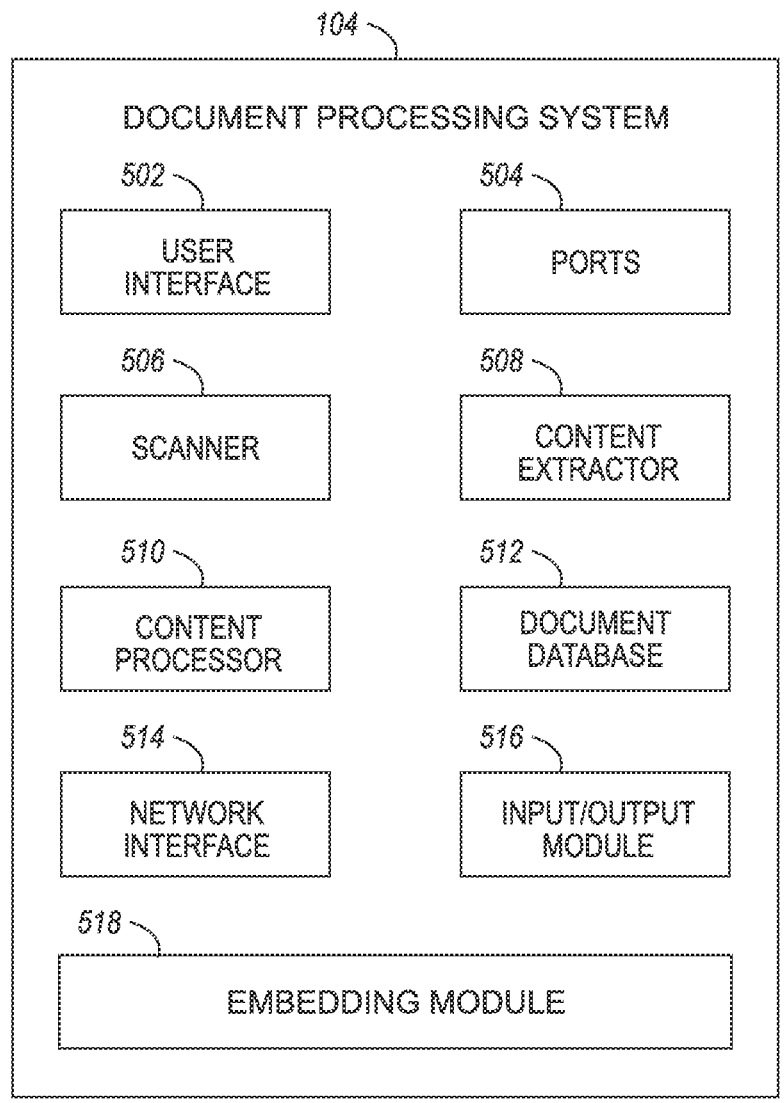
FIG. 5 illustrates structural components of a document processing system.

FIG. 5 illustrates structural components of the document processing system 104, in accordance with an embodiment of the present disclosure. As discussed with reference to FIG. 1, the user 102 can access one or more types of the documents or forms and can fill them out by hand or by using the document processing system 104. The document processing system 104 can process the documents or forms. For example, the document processing system 104 can convert the form from one language to another. The document processing system 104 may include a user interface 502 through which the user 102 can interact with the document processing system 104. Further, the document processing system 104 includes a number of ports 504 to attach to one or more systems or devices such as the MFD 202, a printer, etc. The ports 504 can be serial ports, parallel ports or a combination of these. A scanner 506 of the document processing system 104 can scan documents or forms. In addition, a content extractor 508 of the document processing system 104 can extract content from the forms and a content processor 510 can process it further. The document processing system 104 includes a document database 512 for storing user profiles, filled or un-filled forms, form templates, and so forth. The document processing system 104 also includes a network interface 514 for connecting to other devices or systems through a network such as the Internet, LAN, and so forth. The document processing system 104 also include an Input/Output (I/O) module 516.

The user 102 can fill a first form a local language of the user 102 including one or more fields in and submit it through the I/O module 516. The local language can be any language such as Spanish, French, Malayalam, and so forth depending on the country and region of the user 102. The user 102 can read the instruction in his/her local language and can fill the form using an official language or a second language. The official language is a language of a country or state or region accepted for the official communication. Usually, the government of that country or region or state may decide or select the official language for official documentation. The questions in the first form are in local language so that the user can understand them correctly and fill the form accurately. Further, the first form includes fields filled by the user 102. In an exemplary scenario, if the local language of the user 102 is Hebrew and official language of the user 102 is English, the first form may include instructions in Hebrew language to allow the user 102 easily to fill in the responses.

The document processing system 104 may include a platen or the I/O module 516. The user 102 can place or input the filled first form through the platen or the IO module 516. The platen is a flat glass, metal or wooden surface on which the user 102 can place the filled first form or other documents for scanning or further processing. Then, the scanner 506 can scan the filled first form submitted by the user 102. Further, the scanner 506 can scan and generate one or more images from the filled first form. In one embodiment, the scanner 506 may be a flatbed scanner. Then, the content extractor 508 may extract the content inserted by the user 102 from the scanned filled first form. The content can be extracted using a conventional match-lifting algorithm that relies on some of the several image path solutions. Though not mentioned, the content can be extracted using any of the conventional algorithms. The content extractor may include the match-lifting algorithm. The match-lifting algorithm may first extract the difference between the filled first form and the original unfilled first form as stored in the database 512. The document database 512 may store one or more unfilled different types of forms (or other types of forms) or the filled forms submitted by the users. The match-lifting algorithm computes pixel-by-pixel difference between the filled up form and the original unfilled form. For example, in a binary image, whichever pixels are filled on the original form are removed from the filled up image. Further, extracting the difference can result in loss of some portions of the entries made especially those, which were made over the original form's contents. The content processor 510 can rebuild the content using a conventional broken stroke reconstruction algorithm. The small gaps in the figures or images can be quite accurately bridged using structural analysis and stroke extension. A conditional dilation algorithm is an existing stroke reconstruction algorithm, which can be used to rebuild lost content.

The document processing system 104 may further include an embedding module 518 for embedding the rebuilt content into corresponding fields of a second form, which may be in a different language to the first form. The embedding module 518 may include a merge module (not shown) that merges multiple images into a single combined image. The module for embedding may also include a scaling module (not shown in the FIG. 5) for comparing image size to the space available and scaling the image to accommodate the space. Thus, the rebuilt content may have to be scaled in order to fit into the corresponding field of the second form. The scaling module may also compare the pixel height of the content for each field and scale the content for the various fields to a common pixel height. The scaling module may increase or decrease the size of the image with the extracted entries to the size of the second form.

The embedding module 518 can embed the extracted contents into a second form i.e. an empty official language form. The second form includes one or more fields and instructions in the official language such as English or a language different than of the first form. In one embodiment, a conventional imaging module such as XEngine NMerge can merge multiple extracted input images into a single output image. The XEngine NMerge merges multiple input images into a single output image; the first image is the primary image. A simple threshold value may be used to merge the images, control and merge points can be defined to control positioning. The control point is a location with respect to the secondary image that is centered on the merge point.

The scaling module of the embedding module 518 may first process the input images to make sure that they all have the same settings such as number of bits/pixels, interleave, compression and so forth. If there is a difference in dimensions or settings of the content, appropriate scaling is done by the scaling module. Further, the embedding module 518 embeds or overlays the content on the unfilled second form based on the type of form chosen by the user 102. Further, the extracted content can be overlaid or merged with the second form using an opacity argument value such as 0.4 (allowed values 0.0-1.0). The opacity argument allows the user to merge secondary images into the primary image in a partially transparent manner. An opacity value of 1.0 is a normal copy, an opacity value of 0.0 means that no secondary image information is copied into the primary image. The opacity value allows merging of ghost like imagery into primary images. The document processing system 104 can be used with any set of languages, if the corresponding forms are available in the database 512. Further, according to the present disclosure, the extracted content may be overlaid on the unfilled second form without any translation. The document processing system 104 includes a transceiver configured to send a number of forms such as the filled second form to a remote processing system 106.

Further, as shown in FIG. 2, the document processing system 104 is integrated in the MFD 202. In such a scenario, the document processing system 104 may not include one or more modules as described in this FIG. 6 such as the user interface 502.

Figure 6:
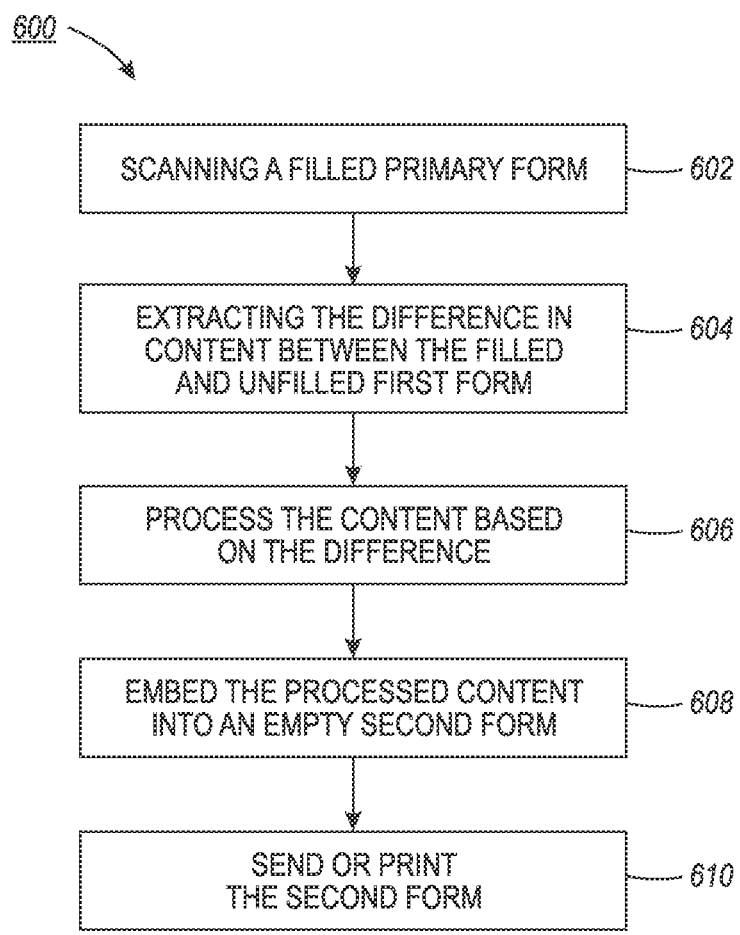
FIG. 6 is a flowchart illustrating a method for processing documents or forms in different languages.

FIG. 6 is a flowchart illustrating a method for processing documents or form in different languages. As described in FIGS. 1 to 5, the user can interact with the document processing system 104 or the MFD 202 for document processing or availing one or more services, respectively. The associated remote processing system 106 may further process the documents. The user 102 can fill a first form in a local language. Then the user 102 can submit the filled first into the MFD 202 or the document processing system 104 depending on the system as disclosed in FIGS. 1-3. The user 102 can submit the filled out form by placing it on a platen of the MFD 202 or the document processing system 104. The platen is a flat glass or metal surface on which the user 102 can put the filled first form for scanning. The platen is part of the MFD, when the document processing system 102 is integrated with the MFD 202 (as shown in FIG. 2). Alternatively, the platen can be a part of the document processing system 104 when it is not a part of the MFD 202.

At step 602, the scanner 506 of the document processing system 104 scans the filled first form submitted by the user 102. The scanner 506 can be a flatbed scanner. Then, at step 604, the content extractor 508 extracts a difference in content between the filled and unfilled first form. The match-lifting algorithm can be used to extract the content from the filled first form. The match-lifting algorithm may first extract the difference between the filled first form and the original unfilled first form as stored in the database 512. For example, in a binary image, whichever pixels are filled on the original form is removed from the filled up image leaving behind only the filled up content. The database 512 maintains profile information of the users and stores different types of filled or unfilled forms.

At step 606, the content processor 510 processes the content to rebuild lost content and provide rebuilt content. This may include a broken stroke reconstruction algorithm. Further, extracting the difference can result in loss of some portions of the entries made especially those, which were made over the original form's contents. The content processor 510 can rebuild the content using a broken stroke reconstruction algorithm. The small gaps in the figures or images can be quite accurately bridged using structural analysis and stroke extension. Conditional dilation algorithm is an existing stroke reconstruction algorithm, which can be used to rebuild lost content.

Thereafter, the embedding module 518 embeds the rebuild content into an empty second form at step 608. The second form includes multiple fields and instructions in the official language or in a language different from the language of the first form. The embedding module 518 may include a merge module (not shown) that merges multiple images into a single combined image. The module for embedding may also include a scaling module (not shown in the FIG. 5) for comparing image size to the space available and scaling the image to accommodate the space. Thus, the rebuilt content may have to be scaled in order to fit into the corresponding field of the second form. The scaling module may also compare the pixel height of the content for each field and scale the content for the various fields to a common pixel height. The scaling module may increase or decrease the size of the image with the extracted entries to the size of the second form.

Eventually, the second form is ready for the processing at a back or remote office, i.e., the remote processing system 106. Then, at step 610, the second form is printed or sent to the remote processing system 106. Alternatively, a combined image including the primary image including the content of the secondary image may be printed. The user 102 can sign the printed form and can again submit the signed filled second form. Thereafter, the document processing system 104 or the MFD 202 can send or forward the form to the associated remote processing system 106.

The methods and the system as disclosed in the present disclosure can be implemented by any business process automation, in particular in multi-languages. Any company with the needs of using local language(s) as the language of communication at the customer front end and an official language at the document processing and record keeping location would be interested in the disclosed system and method. An advantage of the disclosed system and method is that it can be used for any sets of languages, if the corresponding forms are available in the document processing system or at a third party system. Another advantage of the system is that the user can fill the document or the form by understanding the questions and fields in their local languages.

It will be understood that the modules and the databases referred to in the previous sections are not necessarily utilized together in a single document processing system. Rather, these modules are merely exemplary of the various modules that may be implemented within a document processing system. Further, it will be understood that the document processing system and the MFD may include more modules than the ones described in this disclosure without departing from the scope of the present disclosure.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A document processing system comprising:
a scanning device configured to scan a first form in a first language, including one or more fillable fields filled with content of the first language;
a content extractor configured to extract the content from a space provided for each of the scanned filled fields and detect a loss of content caused by a size of the content exceeding the space of the scanned filled fields from which the content is extracted;
a content processor configured to process the extracted content, when the content extractor detects the loss of the content, by rebuilding the lost content, using a content rebuilder, into a rebuilt lost content corresponding to the content filled into the first form;
a database including a template of a second form in a second language including one or more fillable fields in a second language corresponding to the fillable fields in the first language of the first form; and
an embedding module configured to embed the processed rebuilt lost content in the first language into the second form to create a single combined merged image of a form with the rebuilt lost content in the first language in the fillable fields from the first form combined into corresponding fillable fields for the second form in the second language.

2. The system of claim 1, wherein the content processor includes a scaling module configured to:
compare content size to the available space defined by the one or more fields of the first form with the one or more fields of the second form; and
scaling the extracted rebuilt lost content or the image to accommodate the space.

3. The system of claim 1 further comprising a wherein the database, which stores a plurality of user profiles and one or more forms in a plurality of languages.

4. The system of claim 1, wherein the embedding module includes: a merge module configured to merge the rebuilt lost content as multiple images into a single combined image.

5. The system of claim 1 further comprising a transceiver configured to send a plurality of forms to a remote processing system.

6. The system of claim 1, wherein the content extractor is configured to extract a difference in content between the filled first form and an un-filled first form.

7. The system of claim 1, wherein the content extractor includes a match-lifting algorithm.

8. The system of claim 1, wherein the content rebuilder is configured to rebuild the lost content in the scanned form based on the difference of the content by using a broken stroke reconstruction algorithm.

9. A method for processing documents at a document processing system, the method comprising:
using a scanning device to scan a first form in a first language including one or more fillable fields filled with content in the first language;
extracting the content from a space provided for each of the scanned filled fields;
detecting a loss of content caused by a size of the content exceeding the space of the scanned filled fields from which the content is extracted;
processing the extracted content by rebuilding the lost content into a rebuilt lost content corresponding to the content filled into the first form;
providing a database including a template of a second form in a second language including one or more fillable fields in a second language corresponding to the fillable fields in the first language of the first form; and
embedding the processed rebuilt lost content in the first language into the second form to create a single combined merged image of a form with the rebuilt lost content in the first language in the fillable fields from the first form combined into corresponding fillable fields for the second form in the second language.

10. The method of claim 9, wherein the content is extracted using a match-lifting algorithm.

11. The method of claim 9, wherein extracting the content comprises extracting a difference in content between the filled first form and an un-filled first form.

12. The method of claim 9, wherein processing the content further comprises rebuilding the lost content in the scanned form by using a broken stroke reconstruction algorithm.

13. The method of claim 12, wherein processing the content further comprises scaling the rebuilt lost content to correspond to a size of the corresponding field in the second form.

14. The method of claim 9, wherein embedding the extracted content into a second form comprises merging the extracted content with the second form.

15. The method of claim 14 further comprising printing the second form comprising the embedded content.

16. The method of claim 9 further comprising comparing pixel height of the content for each field of the first form and scaling the rebuilt lost content for the one or more fields to a common pixel height.

17. The method of claim 9, further comprising storing, in the database, a plurality of user profiles that include one or more forms in a user-preferred language.

18. A method for processing documents at a document processing system, the method comprising:
  using a scanning device to scan a first form in a first language that includes one or more fillable fields filled with content in the first language;
  extracting the content in the first language from a space provided for each of the filled fields to define a secondary image;
  detecting a loss of content in the secondary image caused by a size of the content exceeding the space of the scanned filled fields from which the content is extracted;
  processing the extracted content by rebuilding the lost content into a rebuilt lost content in the secondary image corresponding to the content filled into the first form;
  providing a database including a template of a second form in a second language that defines a primary image including one or more fillable fields in a second language corresponding to the fillable fields in the first language of the first form; and
  overlaying or merging the secondary image in the first language with the primary image to define a combined image, wherein the primary image comprises the second form in the second language with the fillable fields in the second language corresponding to the fields of the first form in the first language.

19. The method of claim 18, wherein extracting the content comprises extracting a difference in content between the filled first form and an un-filled first form.

20. The method of claim 19, wherein the content is extracted using a match-lifting algorithm.

21. The method of claim 18, wherein the rebuilding includes using a broken stroke reconstruction algorithm.

22. The method of claim 18, further comprising scaling the rebuilt content of the secondary image to fit the fields of the second form.

23. The method of claim 18, further comprising comparing pixel height of the rebuilt content in each field and scaling the rebuilt content to a common pixel height.

24. The method of claim 18, further comprising printing the combined image.

25. The method of claim 18, further comprising storing, in the database, a plurality of user profiles that include one or more forms in a user-preferred language.

\* \* \* \* \*